United States Patent [19]

Dalton et al.

[11] 3,876,987

[45] Apr. 8, 1975

[54] MULTIPROCESSOR COMPUTER SYSTEMS

[76] Inventors: Robin Edward Dalton, 20 Constable Rd., Rugby; Brian Harry Phillips, 7 The High Leys, Crick, both of England

[22] Filed: Apr. 24, 1973

[21] Appl. No.: 354,120

[30] Foreign Application Priority Data

Apr. 26, 1972 United Kingdom ............... 19364/72

[52] U.S. Cl. ............................................. 340/172.5

[51] Int. Cl. ............................................. G06f 11/00

[58] Field of Search ............ 340/172.5; 235/153 AE

[56] References Cited

UNITED STATES PATENTS

| | | | |
|---|---|---|---|
| 3,386,082 | 5/1968 | Stafford et al. | 340/172.5 |
| 3,541,517 | 11/1970 | Belt et al. | 340/172.5 |
| 3,562,716 | 2/1971 | Fontaine et al. | 340/172.5 |
| 3,564,502 | 2/1971 | Boehner et al. | 340/172.5 |
| 3,641,505 | 2/1972 | Artz et al. | 340/172.5 |
| 3,654,603 | 4/1972 | Gunning et al. | 340/172.5 |
| 3,715,729 | 2/1973 | Mercy | 340/172.5 |
| 3,721,961 | 3/1973 | Edstrom et al. | 340/172.5 |
| 3,735,360 | 5/1973 | Anderson et al. | 340/172.5 |
| 3,735,362 | 5/1973 | Ashany et al. | 340/172.5 |

*Primary Examiner*—Gareth D. Shaw
*Assistant Examiner*—Mark Edward Nusbaum
*Attorney, Agent, or Firm*—Kirschstein, Kirschstein, Ottinger & Frank

[57] ABSTRACT

A Multiprocessor computer system in which each processor has a fault channel which can be accessed by another processor of the system, thereby permitting operation of the former processor to be monitored by the latter. The fault channel effectively provides the latter processor with all the facilities which are provided to a human operator by the control console of a conventional computer. Each processor is arranged to open its fault channel, and issue a request for attention by another processor, whenever a fault is detected by it.

9 Claims, 10 Drawing Figures

MULTIPROCESSOR COMPUTER SYSTEMS

BACKGROUND OF THE INVENTION

1. Field of the Invention

This invention relates to multiprocessor computer systems and is particularly, although not exclusively, concerned with such systems for use in controlling telecommunications exchange equipment.

2. Description of the Prior Art

Multiprocessor computer systems have been proposed, comprising a plurality of independent, simultaneously operating data processors sharing a common data store and each having access to any one of a set of input/output channels. The data processing workload of the system is divided among the processors, and in general all the processors are regarded as being equivalent, so that any particular item of data processing which is required can be performed on any one of the processors that is available at that time.

In certain applications of computer systems, such as in the control of telephone exchange equipment, security (in the sense of system reliability) is of paramount importance. Multiprocessor systems are advantageous in such applications, since it can be arranged that failure of one processor does not result in complete breakdown of the system, but only reduces its total capacity for processing data. However, it is clearly desirable that a faulty processor should be recognised as quickly as possible, and that the fault should be diagnosed and rectified with the minimum delay.

One object of the invention is to provide a multiprocessor computer system having novel means for dealing with faults occurring in the processors of the system.

SUMMARY OF THE INVENTION

According to the invention, a multiprocessor computer system comprises: a plurality of independent data processors each having a data interface and a monitoring interface; a data store, common to all said processors, to which each of said processors has access; a plurality of data highways, one for each of said processors, for conveying data to and from said data interfaces, of the respective processors; and a plurality of input/output channels connected to said data highways, each processor thereby having access to any one of said channels over its respective data highway; characterised by a plurality of fault channels each of which is associated with a respective one of said processors and can be opened or closed by instructions from that processor, each fault channel being connected on the one hand to the monitoring interface of its associated processor and on the other hand to the data highway of at least one other processor, thereby permitting operation of said associated processor to be monitored by said other processor when that fault channel is opened Preferably, the system further includes an interrupt unit for receiving requests for service from any one of said processors and for selecting another of said processors to attend to that request, and each of said processors includes fault detection means for detecting faults occurring in that processor and for causing that processor, on occurrence of such a fault, to exclude itself from normal operation, to open its associated fault channel, and to apply a request for service to said interrupt unit. Preferably, when a processor is selected by said interrupt unit to attend to a request for service from another processor, the selected processor obtains access to the requesting processor over the fault channel of the requesting processor and thereupon subjects the requesting processor to predetermined tests in order to diagnose the condition of the requesting processor.

Preferably, each said processor further includes a timing means for timing a predetermined time-out period, said time-out period being started whenever the associated fault channel is opened, and being restarted when access is made to the processor over the fault channel by another processor, expiry of said time-out period causing the fault channel to be closed again and causing the processor to run a self-testing program, whereupon, if said self-testing program is correctly completed, the processor is allowed to return to normal operation.

BRIEF DESCRIPTION OF THE DRAWINGS

One multiprocessor computer system in accordance with the invention will now be described, by way of example, with reference to the accompanying drawings, of which.

PREFERRED EMBODIMENT OF THE INVENTION

Hardware — General Description

Figure 1:
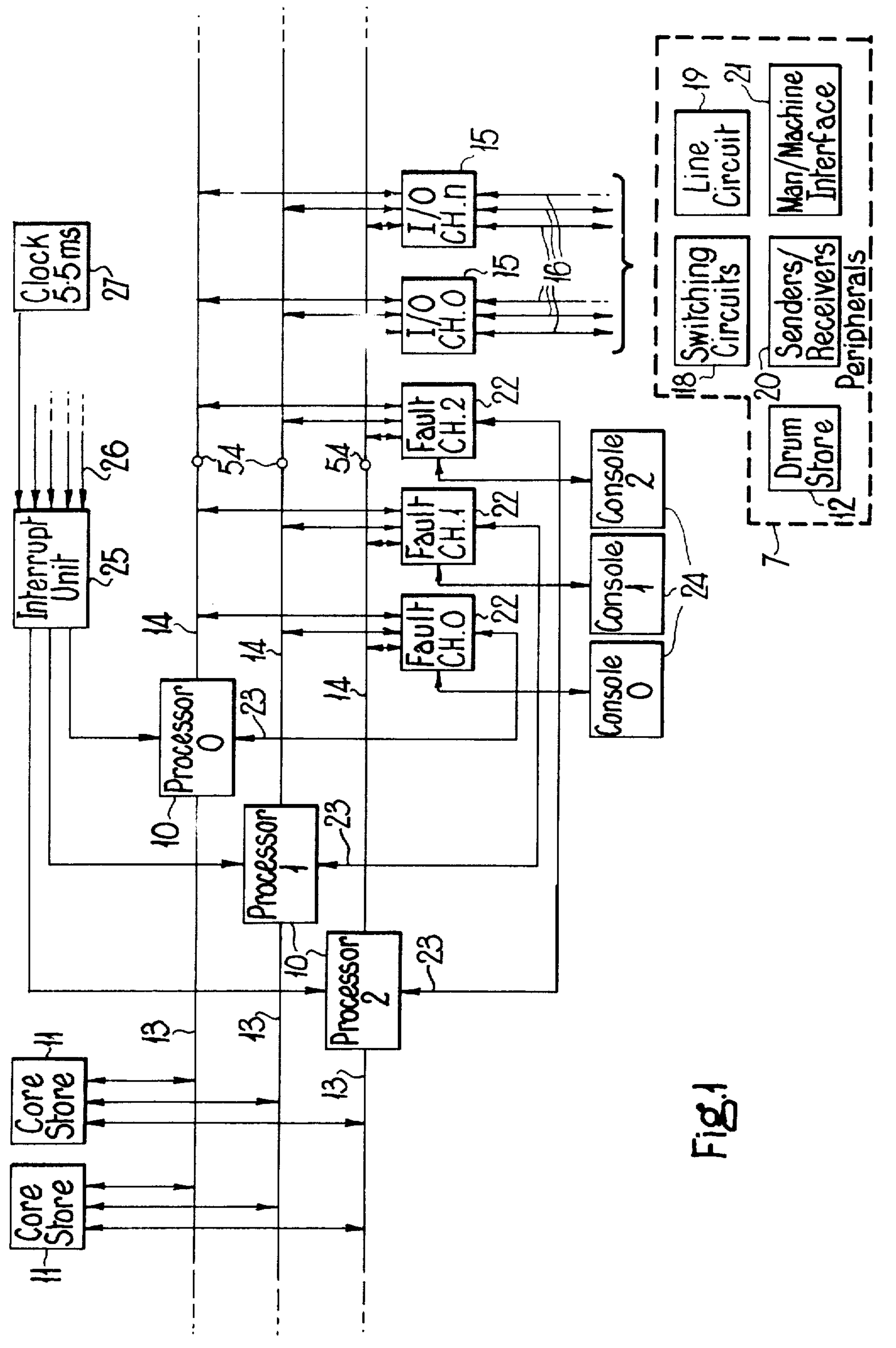
FIG. 1 is a schematic block diagram of the system.

Referring to FIG. 1, the system includes a plurality (in this case three) of independent data processors 10, referred to as processors 0, 1 and 2 respectively. (Other systems may have more than three, or may have only two processors). Each processor 10 has access to a number of core-store memory units 11 via respective data highways 13, each of the memory units 11 being common to all the processors. The construction of the processors 10 and of the memory units 11 will not be described in detail, since such items of equipment are well known in the computer art, and suitable equipment is readily available commercially.

Each processor 10 has a respective input/output data highway 14 connected to its data input/output interface. These highways provide access to a number of input/output channels 15, each of which has a number of subchannels 16, connected to respective peripheral circuits 17 of the system. The peripheral circuits may comprise, for example, drum stores 12, telephone switching circuits 18, line circuits 19, senders and receivers 20, and man/machine interface units 21 such as teletypewriters. Each subchannel 16 is potentially accessible by any one of the processors. Some of the peripheral circuits may have whole channels 15 dedicated to them. In some special cases, access to a peripheral circuit may be through a choice of two channels, so that failure of one channel will not prevent access to that circuit.

Each of the input/output data highways 14 comprises three groups of eighteen wires each, making a total of fifty-four wires as indicated in the drawing. The first group of eighteen wires constitutes an address path, by means of which the processor 10 may select any one of the subchannels 16 for transfer of information to or om that subchannel. The second and third groups of ghteen wires serve as data send and receive paths for spectively conveying data to and from the selected bchannel. Each group of eighteen wires carries information in the form of two eight-bit bytes (referred to the upper and lower bytes), each byte having a parity t which provides a check on correct transmission of e bytes.

Six bits of the upper byte on the address path serve identify the channel 15 which is to be addressed. ach of the channels 15 has a unique six-bit address, id is provided with a decode logic circuit (now iown) to recognise that address when it appears on ie address path. The lower byte identifies which of the ibchannels 16 within that channel is to be selected, id is used to control a multiplexer (not shown) within ie channel so as to connect the selected subchannel to ie data send and receive wires of the input/output ighway.

The system also includes a plurality of fault channels 2, one for each of the processors 10. Each fault chanel is connected to the input/output highway 14 of each f the processors, and can be addressed by any one of ie processors in exactly the same way as the input/output channels 15. However, instead of being connected subchannels 16 and hence to peripheral circuits 17, ie fault channels 22 are connected to monitoring input/output interfaces 23 of the respective processors 0. Each processor 10 also has a respective console nit 24 associated with it, the console unit being conected to the monitoring interface 23 of the processor y way of the fault channel 22 of that processor.

The operation of the fault channels will be described elow in detail. Briefly, however, each channel is con-olled by its associated processor and can be placed in n "open" or a "closed" condition by that processor. Vhen the fault channel is closed, operation of the proessor can be monitored manually by a human operaor, from the associated console unit 24. However, hen the fault channel is opened, the operation of the rocessor can be monitored automatically by any other ne of the processors, over the fault channel, the manal console controls being overridden.

Each of the input/output channels 15 and fault chanels 24 is provided with an access circuit (not shown) s described in U.S. Pat. No. 3,798,591 which prevents iore than one processor from gaining access to the hannel at a time. The memory units 11, 12 have simiar access circuits.

In FIG. 1, each fault channel 22 is shown connected o all the input/output highways 14. However, it is not, n fact, essential for a fault channel to be connected to he input/output highway of its associated processor. Moreover, in some cases, it may be arranged that each ault channel is connected to only one highway, so that s it accessible to only one processor: for example, fault channel 0 may be accessible only to processor 1, fault channel 1 only to processor 2, and fault channel 2 only o processor 0.

The system further includes an interrupt unit 25 inked with each of the processors, and having a numer of trigger inputs 26, some of which are connected o the peripheral equipment, and others of which are connected to the processors and to a clock 27.

The interrupt unit may, for example, be of the type shown and described in U.S. Pat. No. 3,048,332. Briefly, however, some of the inputs 26 are "immediate interrupt" inputs, the rest being non-immediate. When an interrupt request is applied to one of the "immediate" inputs, the interrupt unit searches for the processor which is running the lowest priority process (see below for a discussion of "processes" and "priority") at that particular instant and interrupts that processor. The contents of the registers of that processor are "nested" i.e., stored in a special area of the core stores 11 allocated to the process so as to allow the interrupted process to be returned to later, and a program known as the "supervisor" (see below) is then automatically run on that processor. The non-immediate inputs do not cause an interrupt, but merely serve to indicate to the system that, for example, a peripheral equipment is requiring attention. The signals from these non-immediate inputs are serviced periodically by the supervisor program, as will be described.

Fault channel

Figure 2:
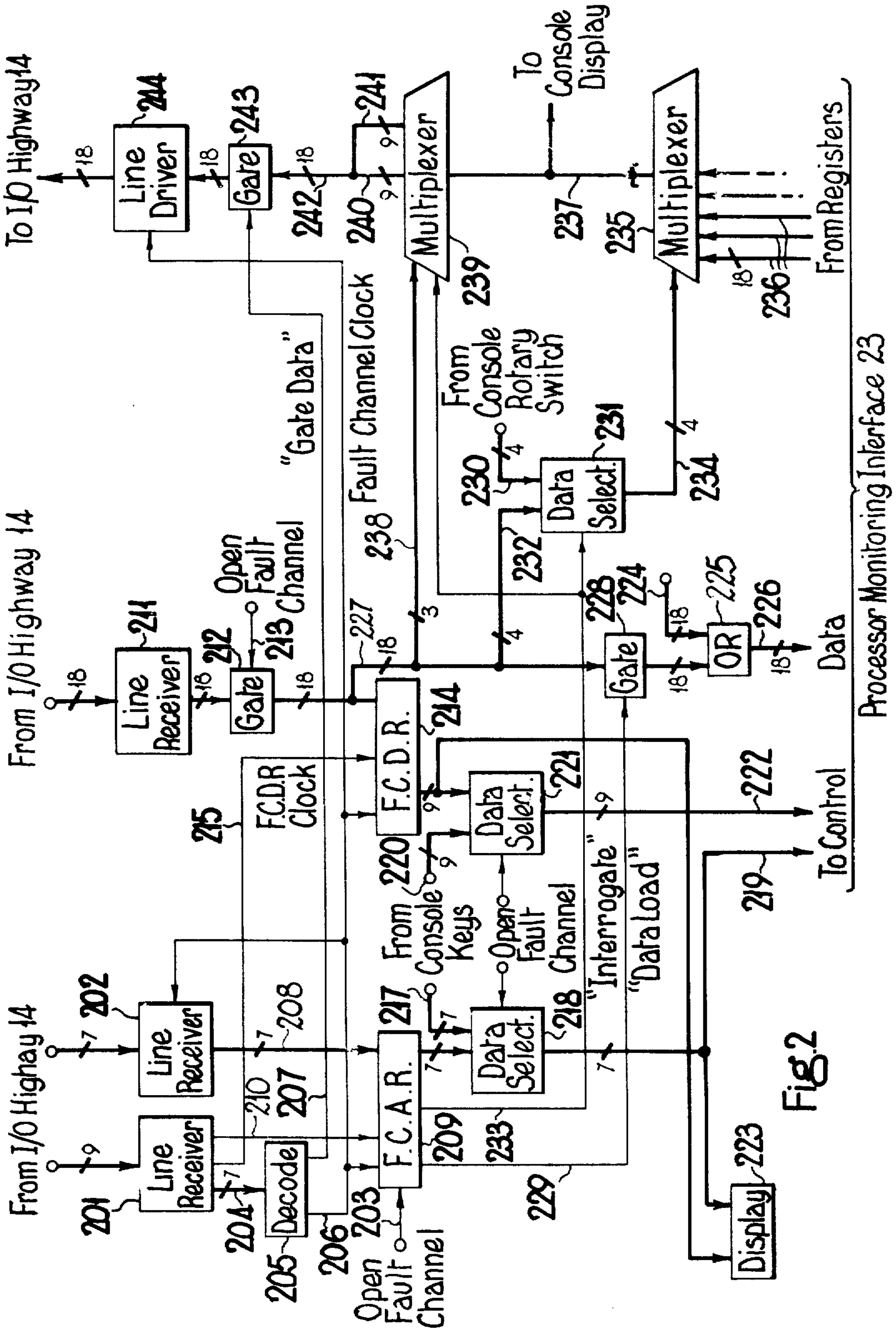
FIG. 2 is a schematic block diagram of a fault channel of the system.

The construction of the fault channels 22 will now be described in detail. Reference will be made first to FIG. 2, which is a block schematic circuit diagram of one of the fault channels, assumed to be fault channel 0 (i.e., the fault channel connected to the monitoring interface of processor 0). For convenience of description, it will be assumed that this fault channel is accessible only to processor 1, so that no access circuit is necessary to prevent more than one processor at a time gaining access to the fault channel.

Referring to FIG. 2, the fault channel includes two line receivers 201, 202 which are connected to the eighteen address wires of the input/output highway of processor 1. Bits 0–5, and the parity bit, of the upper byte of the address are fed to the receiver 201, along with bits 6 and 7 of the lower byte. (The eight bits of each byte are numbered 0–7). Bits 0–5, and the parity bit, of the lower byte are fed to the receiver 202.

The receiver 201 passes the bits 0–5 of the upper byte, along with their parity bit, over a seven-wire path 204 to a decode logic circuit 205, which is arranged to recognise the six-bit address allocated to the fault channel, and to perform a persistence check on this address. When the address is recognised, and the persistence check is satisfactory, the decode logic circuit 205 produces two output signals: the first, on wire 206, is referred to as the fault channel clock signal, while the other, on wire 207, represents an instruction to gate data from the fault channel to the processor input/output highway 14.

The fault channel clock signal is used to activate the line receiver 202, causing it to apply bits 0–5 and the parity bit of the lower byte, over a seven-wire path 208, to the input of a register 209, referred to as the fault channel address register (FCAR). This register 209 is controlled by the fault channel clock signal on path 206, and also by bit 6 of the lower byte, which is applied to it from the receiver 201 over a wire 210, this bit 6 being referred to as the FCAR clock signal. When processor 0 requires to open its fault channel, it produces an output signal, referred to as the "open fault channel" signal, as will be described below, and this signal is also applied to the FCAR 209, on wire 203. Data is written into the register 209 from the line receiver 202 when the fault channel clock signal, the FCAR clock signal and the "open fault channel" signal are all concurrently present.

The fault channel also includes a further line receiver 211 which is connected to the eighteen "data send"

wires of the data highway 14 of processor 1. The data from this receiver is fed through a gating logic circuit 212, which is controlled by the "open fault channel" signal from processor 0 appearing on wire 213, and is applied to the input of another register 214, referred to as the fault channel data register (FCDR) This register 214 is controlled by the fault channel clock signal on wire 206, and also by bit 7 of the lower address byte, which is applied to it from the receiver 201 over a wire 215, this bit 7 being referred to as the FCDR clock signal. Data is therefore written into the register 214 from the line receiver 211 when the "open fault channel" signal, the fault channel clock signal, and the FCDR clock signal are all simultaneously present.

As mentioned above, each processor 10 has a console unit 24. Console units are conventional in most computer systems, and they will not be described in detail here. Briefly, however, each of these console units has a number of control keys, two rotary switches, and a number of display lamps, the purpose of which will become apparent from the following description.

Four of the console keys are connected to a multi-wire path 217 in FIG. 2. This path is connected to one set of inputs of a data selector circuit 218, the other set of inputs being connected to the FCAR 209. The ouput of the data selector 218 is connected by way of a multi-wire path 219 to the monitoring interface 23 (FIG. 1) of the processor, and hence to the control circuitry of processor. Another nine of the console keys are connected to a multi-wire path 220 in FIG. 2. This path is connected to one set of inputs of a data selector circuit 221, the other set of inputs of which is connected to the FCDR 214. The output of data selector 221 is connected by way of signal path 222 to the monitoring interface 23 and hence to the control circuitry of the processor.

The data selectors 218 and 221 are controlled by the "open fault channel" signal from the processor 0. Normally, when the "open fault channel" signal is absent (i.e., when the fault channel is closed) the data selectors 218 and 221 are set so as to connect the paths 217 and 220 to the paths 219 and 222. Thus, in this condition, the operation of the processor control circuitry is controlled by the console keys. The four keys connected to path 217, when depressed, respectively initiate the following modes of operation of processor 0:

i. Instruction one-shot. This causes the processor to execute one instruction of a program.

ii. Transfer one-shot. This causes the processor to execute one transfer in an instruction. (It is conventional in computer systems for each instruction of a program to be translated by a microprogram unit within the processor into a number of transfer operations, these transfers being the basic operations of the machine).

iii. Instruction run. This causes running of the program at normal speed.

iv. Transfer run. This initiates free running of the microprogram clock of the processor.

One of the keys connected to path 220, (referred to as the "console source" key) acts to allow data to be loaded into the processor direct from the console keys, as will be described below. Other keys connected to path 220 act to inhibit various checks and other facilities provided in the processor and to reset the microprogram.

The manner in which the signals from the console keys act upon the control circuitry of the processor so as to produce these modes of operation will not be described in this specification, since it does not form part of the present invention and, in any case, the provision of such console keys is well known in the computer art. Of course, in a conventional computer system, with no fault channel, the console keys would be connected directly to the monitoring interface of the processor, without any intervening data selectors such as 218 and 221.

When the fault channel is open (i.e., when the "fault channel open" signal is present) the data selectors 218 and 221 are set so as to connect the FCAR 209 and the FCDR 214 to the paths 219 and 222. Thus, in this condition, the processor control circuitry is controlled by the contents of the two registers 209 and 214 instead of by the console keys.

The output from the data selector 218, and the output from the FCDR 214 are both displayed on a special fault channel display unit 223, consisting of a set of lamps which are arranged to light up when binary 1 signals appear on the corresponding wires. This allows the operation of the fault channel to be monitored visually.

When the "console source" key referred to above is depressed, the other console keys are automatically disconnected from the paths 217, 220 by means of suitable interlock circuitry in the console, and a special wired-in instruction word is applied to the processor, causing it to read in a data word appearing on a signal path 226, by way of the monitoring interface 23. Depression of the "console source" key also causes further console keys to be connected to a multi-wire signal path 224, which is connected to the path 226 by way of an OR logic circuit 225. The "console source" key thus provides the facility whereby data may be written manually into the processor from the console keys.

As well as being applied to the FCDR 214, the output of the gating logic circuit 212 is also connected, by way of a multi-wire path 227, to another gating logic circuit 228, the output of which is applied to another set of inputs of the OR logic circuit 225. The gating circuit 228 is controlled by a "data load" signal on a wire 229 from the FCAR 209, derived from bit 5 of the channel address lower byte. Thus, when the "data load" signal is present, data can be written directly into the accumulator register of the processor from the input/output highway, by way of line receiver 211, gating circuits 212 and 228, and OR logic circuit 225.

The operation of the console rotary switches referred to above will now be described. Each of these switches has 16 possible positions, and is arranged to produce a unique four-bit output signal in each of these positions. The output from the first one of the rotary switches appears on path 230 in FIG. 2. This path is connected to one set of inputs of a data selector 231, the other set of inputs being connected to a four-wire path 232 derived from the path 227. The data selector 231 is controlled by an "interrogate" signal appearing on a wire 233 from the FCAR, derived from bit 4 of the channel address lower byte. Normally, when the fault channel is closed, the "interrogate" signal is absent, and the data selector 231 therefore connects the path 230 to an output path 234.

The binary number carried on the path 234 is used to control a multiplexer circuit 235, referred to as the display multiplexer. This multiplexer is connected to a first group of the registers within the processor (up to sixteen such registers) by way of respective paths 236, forming part of the monitoring interface 23 of the processor, and is arranged to connect any selected one of these paths to a path 237, which leads to the display lamps on the console. Thus, it will be seen that, when the fault channel is closed, the contents of any one of the first group of registers can be displayed on the console by rotating the first rotary switch to the appropriate position.

The other rotary switch is connected to another display multiplexer (not shown) by way of another similar data selector (also not shown), and is used to display the contents of any one of a second group of the processor registers (up to 16), simultaneously with the first-mentioned display.

Thus, it will be seen that the path 237 carries data from two selected registers — total of four nine-bit bytes (including parity bits).

When the fault channel is open, the appearance of a 1 in bit 4 of the address lower byte received by line receiver 202 causes a 1 to be written into the corresponding stage of the FCAR 209, and this, in turn, causes an "interrogate" signal to be produced on wire 233. This causes the data selector 231 to connect the path 232 to the output path 234, in place of path 230. Thus, in this condition, the display multiplexer 235 is controlled by a signal derived from the line receiver 211, instead of by the rotary switch. The same applies to the other display multiplexer (not shown).

Figures 3, 10:
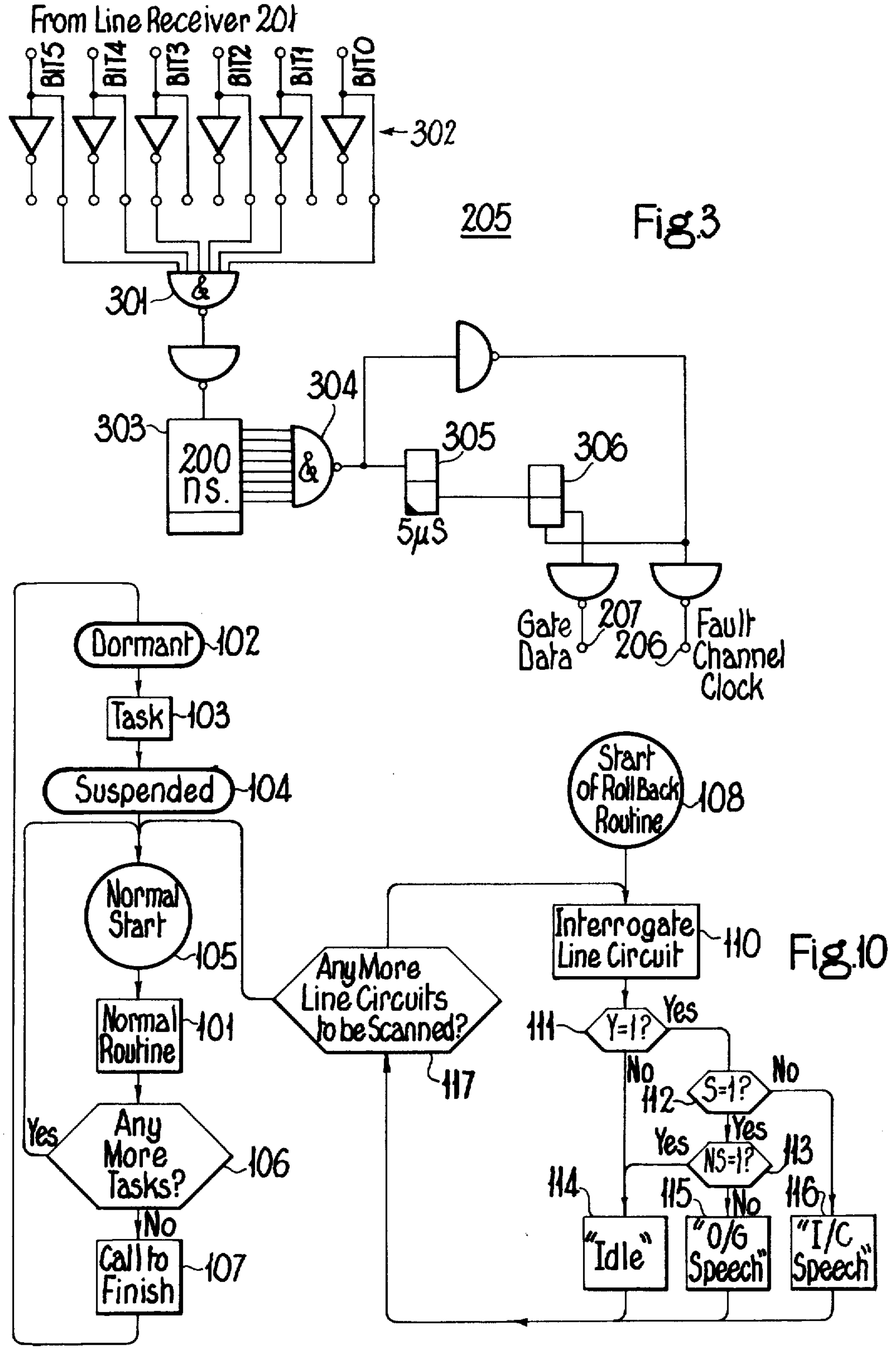
FIGS. 3, 4 and 5 are circuit diagrams showing parts of the fault channel in greater detail.
FIGS. 6 to 10 are flow chart diagrams illustrating the operation of the computer system.

A further three of the bits on path 227 are applied to a path 238, and are used to control a further multiplexer 239, referred to as the fault channel multiplexer, such a multiplexer being shown in Texas Instruments Applications Report CA–132, TTL Data Selectors, in FIG. 10, page 9, and described in the paragraph headed "Multiplexing to Multiple Lines" (August 1969). This multiplexer is normally inoperative, but is activated by the "interrogate" signal on wire 229. When activated, the multiplexer 239 selects one of the four bytes on the path 237 (as determined by the address on the path 238) and applies this byte to a nine-wire output path 240. The multiplexer 239 also contains parity checking circuitry, for checking the parity of the selected byte. The result of this parity check is indicated by generating a secnd nine-bit byte on output path 241, the least significant bit of this byte being 0 if the parity check is passed and 1 if it is failed. (The other bits of this secnd byte may be used by the fault channel for transmitting other information, or may be considered as "spare" bits). The two bytes on paths 240 and 241 are combined on path 242 as lower and upper bytes, respectively, of an 18 bit word.

This 18 bit word is fed to a gating logic circuit 243, which is controlled by the "gate data" signal on wire 207 from the decode logic circuit 205. When this signal is present, the 18-bit word is passed through the gating circuit 243 and is applied to a line driver circuit 244. This circuit 244 is normally inoperative, but is activated by the fault channel clock signal on wire 206 from the decode logic circuit 205, causing the 18-bit word to be applied to the "return data" wires of the input/output highway 14, for transmission back to processor 1.

Thus, it will be seen that the contents of each selected register can be transmitted over the highway 14 in the form of two successive data words, the lower byte of each word containing one byte of the contents of the register, and the upper byte containing an indication of whether or not the byte being transmitted is parity correct. This ensures secure transmission of the register contents over the highways 14, even although the register contents may be parity incorrect.

To summarise, when the fault channel is closed, operation of the associated processor can be monitered manually, using the console keys. In addition, data from any of the processor registers can be displayed on the console, the registers being selected by operation of the console rotary switches. Using the console facilities, it is possible for an operator to perform various tests on the processor, such as running a test program, one step at a time, and checking the contents of the registers after each program instruction or transfer has been executed. In this way, the condition of the processor can be diagnosed, and remedial action taken.

When the fault channel is opened, these tests may be made automatically by processor 1 gaining access to the fault channel, by way of its input/output highway 14.

Referring now to FIG. 3, this shows a detailed circuit diagram of the decode logic circuit 205. The circuit comprises a six-input NAND gate 301 and six inverters 302, which are fed with bits 0–5 of the address upper byte, from line receiver 201 (FIG. 2). The inputs to the gate 301 are connected to the inverters in a manner which depends on the address allocated to the fault channel, such that when this address is applied to the decode circuit, a binary 0 appears at the output of the gate 301. As an example, the drawing shows the appropriate connections for recognising the address 110101.

The output of gate 301 is applied to the input of a 200 nanosecond delay line 303, having eight tapping points connected to a NAND gate 304. This gate 304 therefore produces a binary 0 output whenever the fault channel address, as recognised by the decode circuit, persists for at least 200 nanoseconds. The output from the gate 304 provides the fault channel clock signal on wire 206.

The output from gate 304 also triggers a monostable circuit 305, having a monostable time of 5 microseconds. When triggered, this circuit 305 sets a bistable circuit 306, so as to produce the "gate data"signal on wire 207.

Figure 4:
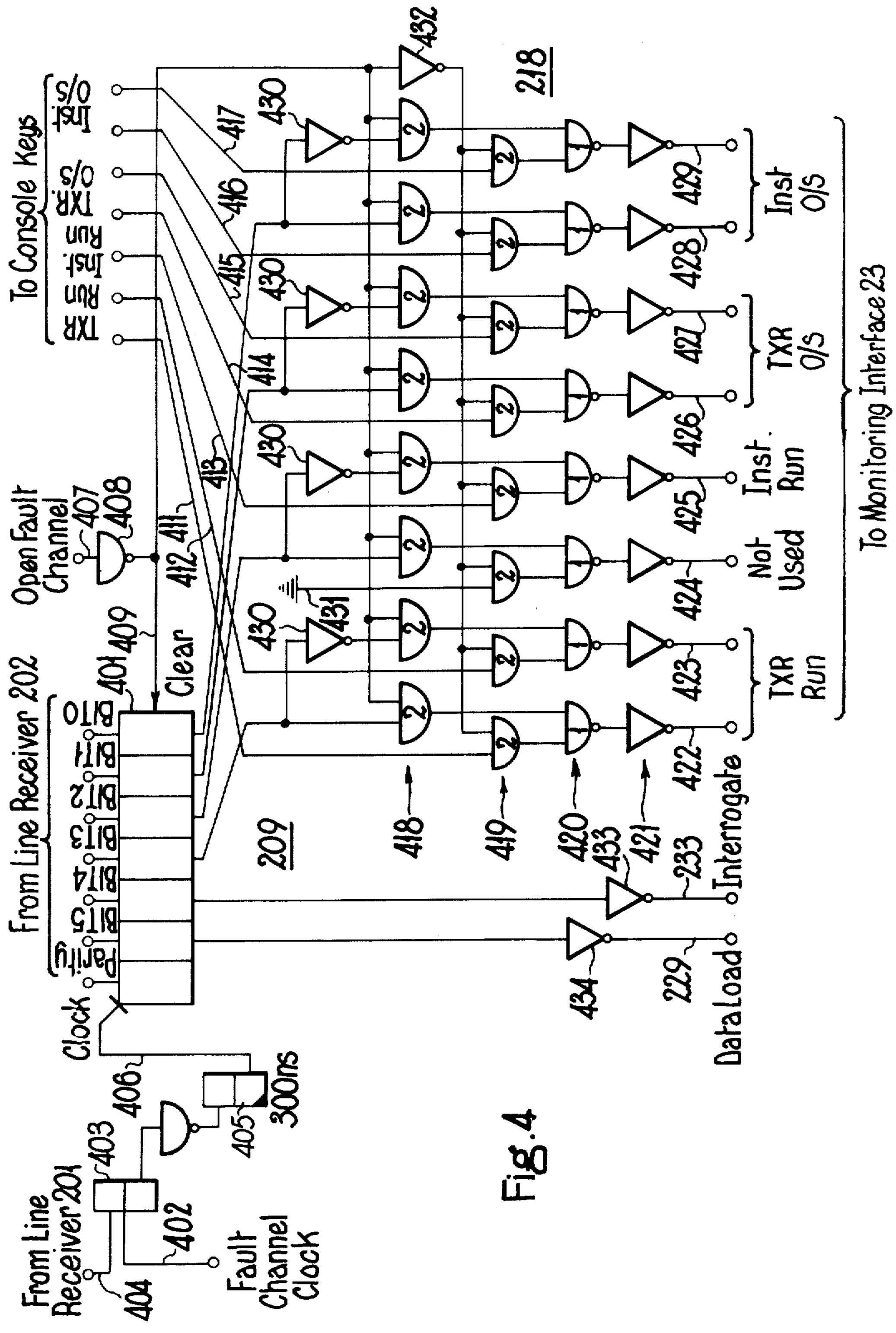

Referring now to FIG. 4, this shows a detailed circuit diagram of the fault channel address register 209 and the data selector 218 of FIG. 2.

The FCAR 209 comprises a seven stage register 401. The seven stages of this register are connected to the line receiver 202 (FIG. 2), so as to receive respectively bits 0–5 and the parity bit of the channel address lower byte.

The fault channel clock signal from the decode logic circuit 205 appears on wire 402, and is used to clock a bistable circuit 403, which can then be set by means of bit 6 of the address lower byte, from receiver 201, on wire 404. When set, the bistable circuit 403 triggers a monostable circuit 405 having a monostable time of 300 nanoseconds, and this in turn applies a clock pulse to the clock input 406 of the register 401, causing it to read in the information presented to it from receiver 202.

The "open fault channel" signal consists of a binary 0 applied to a wire 407 from the associated processor (0). This signal is inverted by gate 408 and applied to the "clear" input 409 of the register 401, so as to prevent data from being entered into the register 401 when the "open fault channel" signal is absent.

The four console keys for controlling the mode of operation of the processor are connected to seven wires 411–417, as indicated in FIG. 4. It will be seen that three of these keys, namely those for transfer run (TXR.RUN), transfer one-shot (TXR.O/S) and instruction one-shot (INST.O/S) are connected to pairs of wires 411/412, 414/415, and 416/417 respectively. When any one of these keys is depressed, it produces binary digits 1 and 0 respectively on its corresponding pair of wires; otherwise it produces digits 0 and 1 respectively. The other key — for instruction run (INST.RUN) — is connected to a single wire 413. When this key is depressed, it produces a binary digit 0 on this wire 413, and a 1 otherwise.

The data selector 218 comprises two sets of eight AND gates each, 418 and 419. The outputs of corresponding pairs of these AND gates are connected respectively to eight NOR gates 420, the outputs of which are, in turn, connected to eight inverters 421. The outputs of these inverters appear on respective output wires 422–429, which are connected to the appropriate points of the processor (0) control unit, via the processor monitoring interface, as indicated. The inputs of four of the first set of AND gates 418 are fed with signals from the first four stages of the register 401 (containing bits 0–3 of the address lower byte). The other four of the AND gates 418 are fed with the inverses of these signals, by way of four inverters 430. The inputs of seven of the second set of AND gates 419 are fed with signals from the seven wires 411–417 from the console keys, the eighth gate having an earthed input 431 representing a permanent binary digit 1.

The data selector 218 is controlled by the "open fault channel" signal from wire 407, as inverted by the gate 408. The signal from the gate 408 is applied to each of the AND gates 418, and is also inverted by an inverter 432 and applied to each of the AND gates 419. Thus, when an "open fault channel" signal is present, the gates 418 are all enabled, and data is passed from the four stages of the register 401 to the wires 422–429. Conversely, when the "open fault channel" signal is absent, the gates 419 are all enabled, and data is passed from the wires 411–417 (i.e., from the console keys) to the wires 422–429.

Thus, it will be seen that when the fault channel is closed, the console keys act in the normal manner to control the mode of operation of the processor. However, when the fault channel is opened, the mode of operation of the processor is controlled by the contents of the first four stages of the register 401.

The fifth stage of the register 401 (containing bit 4 of the address lower byte) is connected by way of an inverter 433 to the wire 233 (see FIG. 2) and provides the "interrogate" signal referred to previously. Similarly, the sixth stage of the register 401 (containing bit 5 of the channel address lower byte) is connected by way of an inverter 434 to the wire 229 (see FIG. 2) and provides the "data load" signal referred to above.

From consideration of FIG. 4, it will be seen that the bits 0–5 of the address lower byte represent the following six instructions:

Bit 0 = 1 represents "instruction one-shot."
Bit 1 = 1 represents "transfer one-shot."
Bit 2 = 1 represents "instruction run."
Bit 3 = 1 represents "transfer run."
Bit 4 = 1 represents "interrogate."
Bit 5 = 1 represents "data load."

Figure 5:
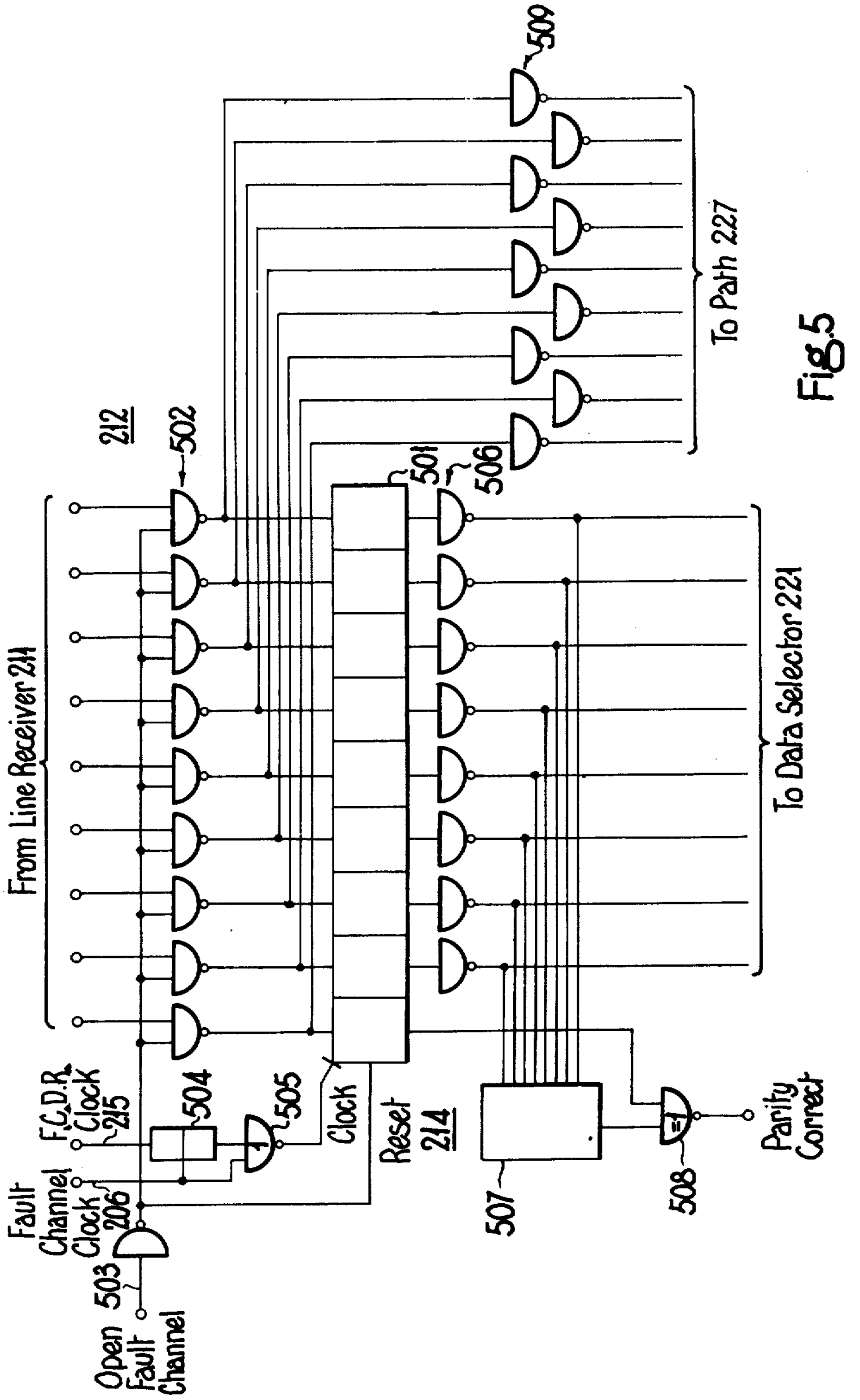

Referring now to FIG. 5, this shows the gating logic circuit 212 and the fault channel data register 214 of FIG. 2 in greater detail.

The FCDR comprises two nine-stage registers: one register 501 for the upper byte, and one (not shown) for the lower byte of the word received from the input/output highway 14 by way of line receiver 211. The gating logic circuit 212 includes nine NAND gates 502 for gating respective bits into the respective stages register 501. These gates 502 are enabled by the "open fault channel" signal from the associated processor, which appears on wire 503. The wire 503 is also connected to the "clear" input of the register 501 so as to reset this register when the "open fault channel" signal is absent.

The FCDR clock signal, from the line receiver 201 appears on wire 215, while the fault channel clock signal from the decode logic circuit 205 appears on wire 206 (see FIG. 2). Occurrence of the fault channel clock signal while the FCDR clock is present causes a bistable circuit 504 to be set, producing an output signal from a NAND gate 505 which clocks the register 501, causing it to read in information from the gating circuit 212.

The outputs from the first eight stages of the register 501 are inverted by gates 506, and passed to the data selector 221 (FIG. 2). The outputs from these gates are also applied to an eight-input parity checker 507, which produces an output signifying whether the sum of the eight data bits in the register is odd or even. The output from the checker 507 is compared with the parity bit from the last stage of the register 501, in an equivalence gate 508, the output of which signifies whether or not this byte is parity correct.

The outputs from the gating circuit 502, as well as being fed to the register 501, are also fed in parallel to NAND gates 509, from which they are passed to signal path 227 (see FIG. 2).

The other (lower byte) register (not shown) of the FCDR has similar circuitry associated with it for gating, clocking, resetting and parity checking.

The other data selectors 221 and 231 shown in block form in FIG. 2 are similar in construction to the data selector 218 which was described in detail with reference to FIG. 4, and will therefore not be described separately. Furthermore, multiplexer circuits such as 235 and 239, line receivers such as 201, 202, and 211, and line drivers such as 244 are all well known items of equipment, and it is not considered necessary to describe them in detail.

Software — General description

The software of the system of FIG. 1 is divided into a number of processes, each of which performs certain specified data manipulation or input/output functions and has a unique priority level assigned to it. Interaction between the processes takes place by transfer from one process to another of blocks of data, in a predetermined format, known as "tasks." This modular construction of the software greatly simplifies the writing of the software, allowing separate processes to be developed by different programming teams.

Where a process has one or more tasks waiting to be examined by it, these tasks are placed in an input queue of tasks for that process (contained in one of the core stores 11, FIG. 1). Where a process has generated one r more tasks, which have not yet been transferred to ther processes, these tasks are placed in an output ueue of tasks from that process (also in one of the ore stores).

Each process has allocated to it an area of the storage pace in the core stores 11 as working storage space hich is not shared with any other process. This enures that faults which may occur during the execution f one process do not corrupt the working data of other rocesses. The processes do, however, share programs nd fixed data stored in the core stores 11 where they re used in a read-only mode.

The drum stores 12 are used to contain copies of all xed data and also of important working data for the rocesses, two copies on different drums. This increases the security of the system against faults affectng the stored data.

Any process can run on any one of the processors 10. This means that all the processors 10 are of equal status, and are completely interchangeable. Thus, if one rocessor is taken out of service, the system can connue operating normally, albeit with a reduced capacy. This is an important feature from the point of view f security against faults.

A process cannot however, be run on more than one rocessor at a time (i.e., the processes are not rentrant). This again helps to contain any faults which nay occur.

A process is, at any given time, in one of the followng states:

a. Running state. In this state, the process is being run n one of the processors.

b. Dormant state. In this state, the process has no asks in its input queue of tasks, and will not run again ntil a task is received.

c. Blocked state. In this state, the process cannot run gain until an event occurs external to that process to nblock it.

d. Suspended state, the process has tasks in its input ueue, and is waiting to run on a processor, but will not un until all higher priority suspended processes have un. When a dormant processes is handed a task, it is ut into the suspended state. Similarly, when a blocked rocess is unblocked, it is put into the suspended state.

Some of the processes may be periodic; i.e., they are ut into the suspended state, ready to run, at periodic ntervals, which are multiples to the clock period (5.5 ns), these processes being blocked at other times. Other processes are non-periodic; i.e., they are put into he suspended state only when they are required — for xample, when called upon by another, running process.

The processes are co-ordinated by a special program nown as the supervisor program. Like the processes, he supervisor can run on any one of the processors. The supervisor deals, *inter alia* with: the transfer of asks from one process to another; setting the processes n the appropriate states (dormant, suspended, locked, running) at the appropriate times; servicing equests from peripherals of the system; and handling ault conditions in the system, as will be described.

Supervisor program

Figure 6:
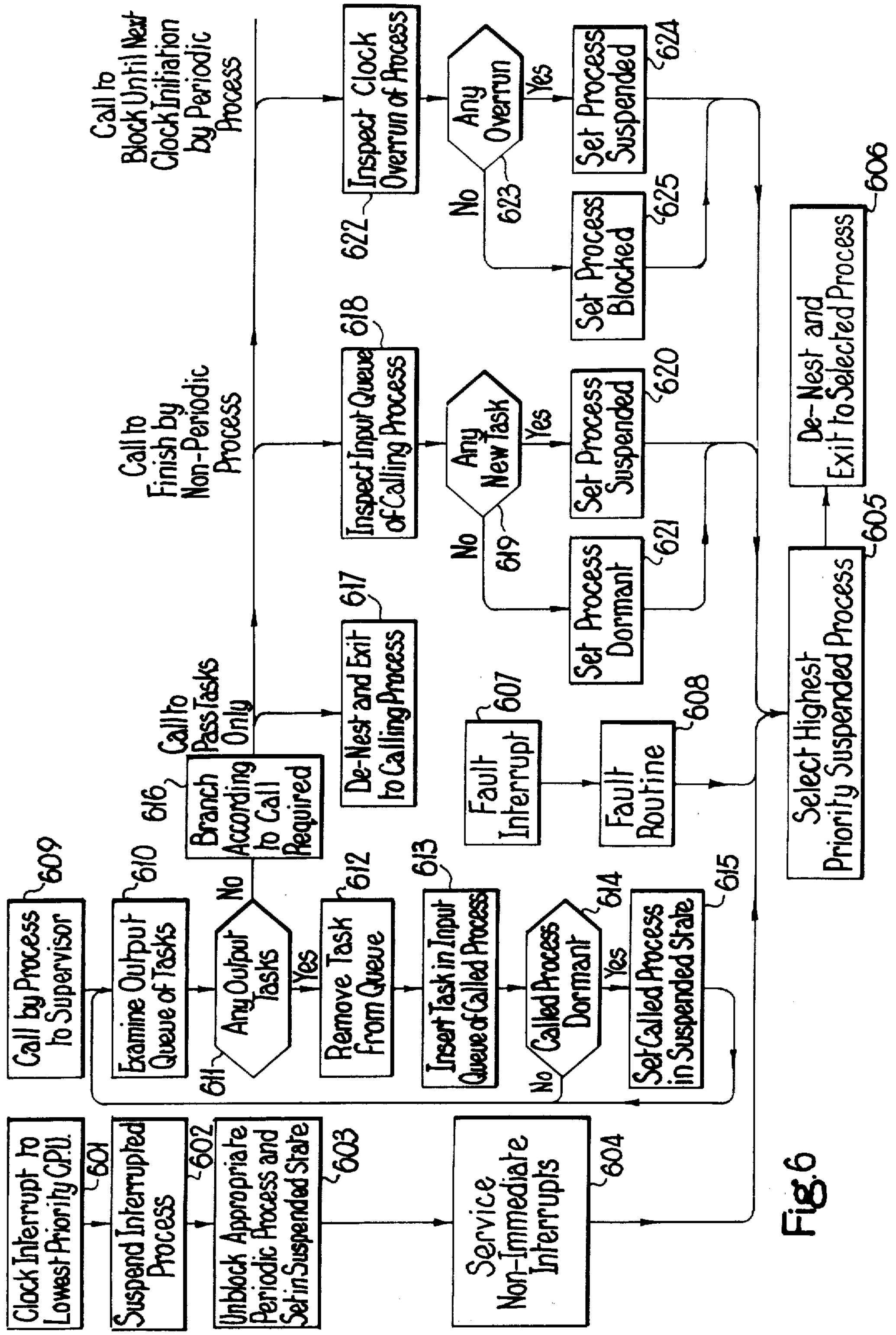

FIG. 6 is a flow diagram illustrating the structure of he supervisor program. Referring to FIG. 6 in conjunction with FIG. 1, at periodic intervals of 5.5 ms, the clock 27 applies a clock signal to one of the immediate nterrupt inputs of the interrupt unit 25. This causes the processor 10 which is running the process with the lowest priority at that moment to be interrupted (as indicated by box 601 in FIG. 6) and its register contents nested. The supervisor is then automatically run on the interrupted processor, and carries out the following operations.

First, the supervisor puts the interrupted process into the suspended state (as indicated by box 602). It then decides which of the periodic processes are due to be commenced at that point in time, and causes these to be unblocked, and hence put in the suspended state (box 603). These processes will therefore commence running again as soon as there is a processor 10 available to them.

Next, the supervisor examines all the non-immediate interrupt inputs of the interrupt unit 25 (box 604). If any of these inputs are activated by requests from their corresponding peripherals or processors, the supervisor services these requests by giving appropriate tasks to processes. The supervisor then resets the interrupt unit 25.

When scanning is complete, the supervisor selects the highest priority suspended process (box 605). Having completed its periodic operation, the supervisor exits from the processor (box 606), performing a "denest," i.e., inserting the values appropriate to the selected process into the registers of the processor on which it (the supervisor) was running. The selected process then takes over running in this processor.

The supervisor may also be initiated (box 607) as a result of an immediate interrupt request (referred to as a "fault interrupt") applied to the interrupt unit 25 from one of the processors 10, as a result of that processor detecting a fault. In this case, the supervisor executes a special fault routine (box 608). When the fault routine is completed, the supervisor proceeds to boxes 605 and 606 as before. The production of a fault interrupt, and the structure of the fault routine, will be described later.

In addition to being run as a result of an immediate interrupt signal, the supervisor may also run, at any time, in response to a "call" by a process which is currently running on one of the processors (box 609). For example:

a. The process may request that one or more tasks which it has generated may be passed to another process or processes.

b. The process may request the supervisor to decide whether it (the process) should continue running, or be put into the suspended, blocked or dormant state.

When a call is made, the supervisor is run on the processor on which the process which made the call was running. The supervisor first of all examines the output queue of tasks (boxes 610 and 611) of the calling process. If there are any such tasks, the supervisor removes them (box 612) from the output queue, and inserts them (box 613) in the input queue of the appropriate process. If the latter process is at that time, in the dormant state (box 614), the supervisor "awakens" it and places it in the suspended state (box 615), so that that process can run when there is an available processor.

If there are no tasks in the output queue of the calling process, or when any tasks that were present have been removed, the supervisor proceeds (box 616) to one of the following three branches, as specified in the call:

i. If the call was only for the supervisor to deal with output tasks, the supervisor de-nests the calling process, and exits to allow the calling process to resume running on the processor (box 617).

ii. When a non-periodic process completes its current processing, it makes a "call to finish" to indicate this to the supervisor. In this case, the supervisor inspects the input queue of the calling process (boxes 618, 619) to determine whether or not there are any more tasks in the input queue. If there are more tasks, the calling process is merely put into the suspended state (box 620), while if there are no more tasks, the calling process is put into the dormant state (box 621). In either case, the supervisor proceeds to select the highest priority suspended process (box 605) which will run on that processor after the supervisor exits.

iii. When a periodic process has completed its current processing, it makes a "call to block," requesting the supervisor to put it into the blocked state, until the next clock interval at which that periodic process is due to run. If overload conditions are present, it is possible that the process will not complete all its current processing before its next clock initiation is due, this condition being known as an "overrun." When a "call to block" is made, the supervisor checks to see if the calling process has overrun (boxes 622, 623). If not, the process is blocked as requested (box 624). However, if the process has overrun, it is merely set in the suspended state (box 625), so that it can start again immediately there is a processor available for it.

Once it has been blocked, the calling process will remain in the blocked state, even if further tasks are received in the meantime, until it is unblocked by the supervisor at the appropriate clock period or is unblocked for some other reason.

As before, when the calling process has been blocked or suspended the supervisor selects the highest priority suspended process (box 605) to run in the processor after the supervisor exits (box 606).

It will thus be seen that the supervisor co-ordinates the operation of the processes setting them in their appropriate states, and transferring tasks between them.

Detection of faults by processors

All the registers in each of the processors 10 contain two bytes, each byte consisting of eight data bits and one parity bit, which signifies whether the sum of the eight data bits is even or odd. Parity checks are made, by means of suitable hardware devices, whenever data is written into, or read out of, or transferred between any of these registers. When a fault is detected by one of these parity-checking devices, it produces a trap signal, which is stored within a special set of trap registers within the processor. A trap signal triggers a hardware trap within the microprogram of the processor, which initiates a predetermined fault action, as will be described.

Such parity checking is well known in the computer art, and the devices for performing these checks, and the corresponding trap facilities in the microprogram, will therefore not be described in this specification.

Figure 7:
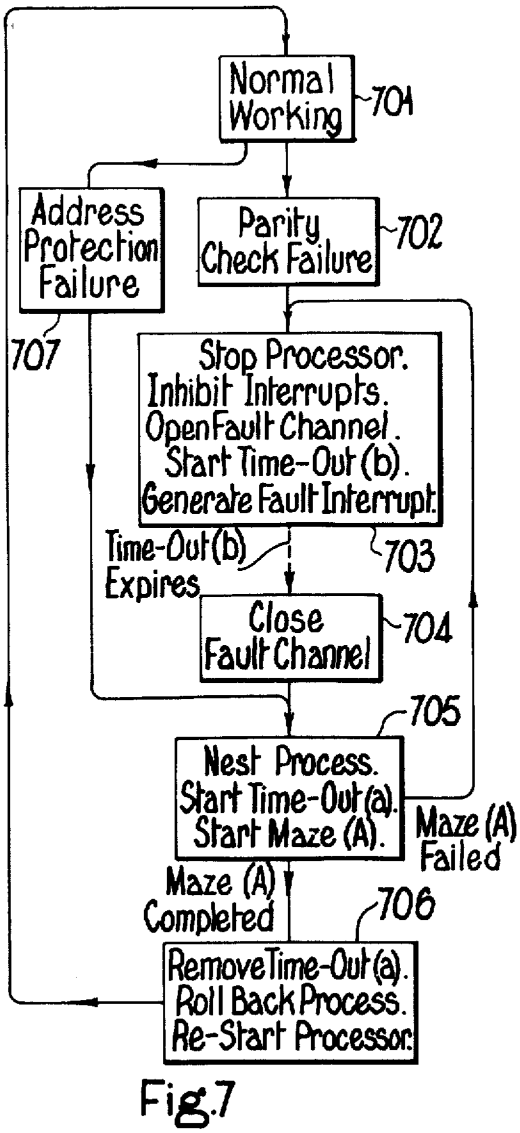

Reference will now be made to FIG. 7, which illustrates the action of one of the processors 10 upon detecting a fault. In this figure, box 701 represents normal operation of the processor, while box 702 represents the occurrence of a trap signifying a parity fault.

Occurence of such a trap causes the processor to stop (box 703) and to inhibit the interrupt inputs to it from the interrupt unit 25, so as to prevent it from being interrupted. The processor then applies an "open fault channel" signal to its associated fault channel 22, and at the same time applies an immediate fault interrupt signal to the interrupt unit 25. Under normal circumstances, this fault interrupt signal will cause interruption of the one of the other processors 10 which is running the lowest priority process at that instant, whereupon the supervisor will be run on that interrupted processor (see FIG. 6, box 607).

In some circumstances, however, the fault interrupt signal may not have any effect. This might happen, for example, after a violent noise burst affecting all the processors. As a precaution against this possibility, at the same time as it generates the fault interrupt signal, the processor also triggers a hardware timing device, known as a time-out device, which then runs for a fixed period (typically 200 milliseconds) unless it is reset. This time-out period is referred to as time-out (b). If the fault interrupt signal has not been answered when time-out (b) expires, the processor will attempt self-testing as follows.

First of all, the fault channel is closed (box 704), the current contents of the registers of the processor are nested (box 705) and a special self-test program, referred to as maze program (A), is run on the processor. At the same time, another hardware timing device is triggered, this device running for a fixed time-out period referred to as time-out (a). The starting information for the maze program is wired into each processor. The maze program runs through a sequence, which includes all the instructions that the processor can execute, to test all of the functions of the processor, checking the results of its actions as it runs. If a fault is present in the processor, the maze program will either trap, stop, or run in a loop. If the processor traps whilst running the maze program, the maze is restarted, but time-out (a) is allowed to continue; trapping would then continue until time-out (a) expires. Similarly, if looping occurs, it will continue until expiry of the time-out. If, on the other hand, the processor reaches the end of the maze program, it executes a special instruction to compare a computed result with a wired-in data word.

If the processor reaches the end of the maze within the time-out (a), and computes the result correctly, it is assumed that the processor is not in fact faulty — the fault indication may have been due to a transient noise burst for example — and the processor is therefore returned to service (box 706), after generating a print-out to indicate to the service engineers the occurrence of the fault. The interrupted process on the processor is commenced again at the start of a routine within the process known as the roll-back routine. This routine attempts to restore the necessary working data to the process. The roll-back routine will be described in greater detail later If the processor does not reach the end of the maze within time-out (a), or if the computed result is wrong, the processor returns to box 703, and opens the fault channel, produces a fault interrupt signal, and re-starts time-out (b). This loop continues either until the fault interrupt signal succeeds in interrupting another processor, or until the fault clears itself and maze (A) is completed correctly.

As stated above, under normal circumstances, a fault interrupt signal produced by a processor will cause interruption of the one of the other processors which is currently running the lowest priority process at that instant, causing the supervisor program to be entered on he latter processor. For convenience, the processor vhich issues the fault interrupt signal will be referred o as the "faulty processor," while the processor which uns the supervisor in response to the fault interrupt ignal will be referred to as the "supervising processor."

Figure 8:
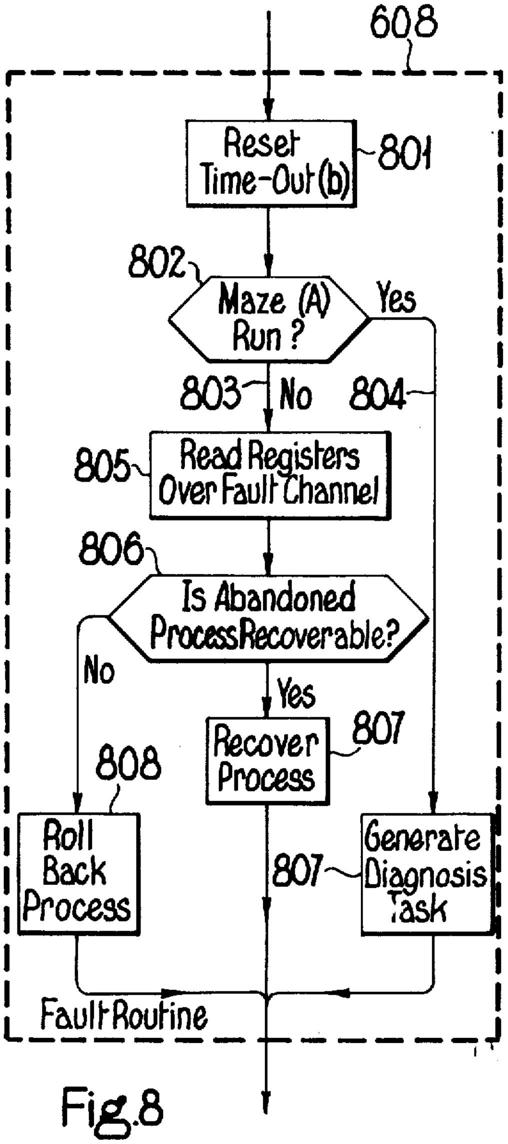

As indicated by FIG. 6, the supervising processor enters a fault routine (box 608). This routine is shown in greater detail in FIG. 8. The first action of the supervising processor is to gain access to the fault channel 22 of the faulty processor, by applying the address of that fault channel to its data highway 14, and to use the fault channel to reset time-out (b) in the faulty processor (box 802). This prevents time-out (b) from expiring, and thus prevents the faulty processor from closing its fault channel again (box 704, FIG. 7).

The supervising processor then interrogates (box 802) the faulty processor over the latter's fault channel, to determine whether it was running normally at the time of the fault, or whether it was running maze (A) at that time. If it was running normally, it is likely that this was only a transient fault (e.g., due to noise), and the supervising processor proceeds along branch 803 to put the faulty processor back into service. (The occurrence of the fault is, however, recorded by the supervising processor in a special table in the core store 11, and if a given processor seems to be having too many transient faults, a fault diagnosis will be initiated.) If, on the other hand, the faulty processor was running maze (A) at the time of the fault, it is more likely that the fault is not a transient one, and the supervising processor therefore proceeds along branch 804 to initiate a fault diagnosis.

Before it returns the faulty processor to service (branch 803), the supervising processor takes action to prepare the abandoned process (i.e., process which was running on the faulty processor at the time of the fault) for running again. The fault may have been such that some of the information (in the core store 11) used by the process has been mutilated or lost, and in that case action must be taken to restore the lost information before the process can continue. However, for some faults, this information may not have been affected, and in this case the process can be restarted at the point where it was abandoned. In the latter case, the process is said to be "recoverable."

On entering branch 803, the supervising processor first reads (box 805) the contents of the trap registers of the faulty processor, in order to determine which of the fault-testing devices caused the trap which initiated the fault interrupt. The supervising processor then decides (box 806) whether or not this fault is of such a nature that it is likely to have caused (or have been caused by) mutilation of information in the core store; i.e., it decides whether or not the abandoned process is recoverable. For example, if the fault occurred while information was being transferred between two of the processor registers, along an internal highway within the processor, it is unlikely to have affected the core store, and the process is assumed to be recoverable. On the other hand, if the fault occurred while addressing the core store, it is assumed that the process is not recoverable.

If the process is deemed to be recoverable (box 807), the supervising processor sets it in the suspended state, ready to start running at the point where it stopped, whenever a processor is available to it. If, on the other hand, the process is deemed not to be recoverable (box 808), the supervising processor sets it in the suspended state, ready to start running from the beginning of a special routine within the process, referred to as the process roll-back routine. (Every process in the system contains a roll-back routine, which is designed to restore necessary working information to the process before it returns to its normal operation). Before doing so, however, the supervisor program itself performs certain operations to restore working information to the process. Roll back will be described in greater detail in a later section.

When the abandoned process has been dealt with, the supervisor program exits from this processor by way of boxes 605 and 606 in FIG. 6, as previously described. Time-out (b) in the faulty processor will then expire, causing that processor to close its fault channel (box 704, FIG. 7) and to run maze program (A) (box 705). If the maze runs correctly, the fault is probably a transient one, and the processor is therefore returned to service as previously described (box 706). However, if the maze fails, a fault interrupt signal is again triggered.

Returning to FIG. 8, as mentioned above, if the faulty processor was running maze (A) at the time of the fault, the supervising processor proceeds along branch 804 to initiate fault diagnosis. This is done by generating (box 809) a "diagnosis" task for a special process, referred to as the "fault channel process," and setting this fault channel process in the suspended state, ready to run whenever there is a processor available for it. The fault channel process is described below, in the next section.

Having initiated the fault diagnosis in this manner, the supervisor program proceeds to boxes 605 and 606 (FIG. 6) as before.

Fault channel process

Figure 9:
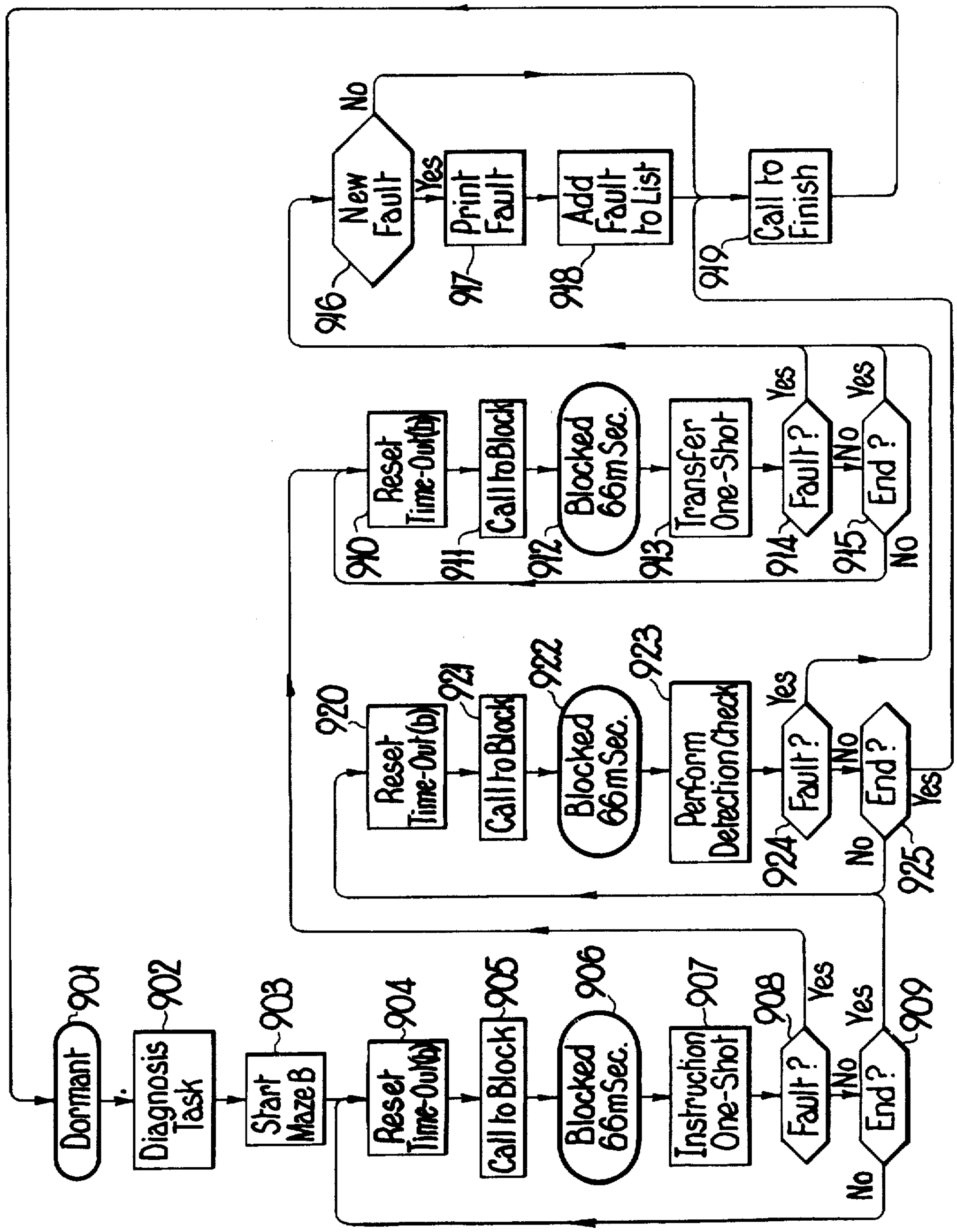

Reference will now be made to FIG. 9, which is a flow diagram of the fault channel process.

As indicated by box 901, the fault channel process is normally in the dormant state. When it is given a diagnosis task (box 902), the process is put into the suspended state, ready to run on any processor 10 which is available to it. This processor is not necessarily the same one as the "supervising processor" referred to above.

The first action of the fault channel process when it is run (box 903) is to address the fault channel of the faulty processor and to write predetermined data into the registers of that processor, over the fault channel, so as to set the faulty processor in a condition ready to execute a special diagnostic program, referred to as maze program (B). This maze program is similar to maze (A), and in fact may use exactly the same sequence of instructions. However, whereas maze (A) is run by the faulty processor under its own control, maze B is run under control of the fault channel process, as will be described.

The process also re-sets time-out (b) in the faulty processor (box 904). This prevents time-out (b) from expiring, and therefore keeps the fault channel open.

Having done this, the fault channel process then makes a "call to block" (box 905) to the supervisor program (see FIG. 6). The supervisor will then place the fault channel process in the blocked state (box 906) for a period of 66 milliseconds, at the end of which the process will be put back into the suspended state, ready to run again on any available processor 10 (not necessarily the one on which it was running when it made the "call to block").

When the process runs again, its first action (box 907) is to apply an "instruction one-shot" command to the fault channel of the faulty processor, causing this processor to execute one instruction of maze (B). The process then (box 908) examines the contents of the registers of the faulty processor, so as to check whether the instruction was executed correctly. If there is no fault, the process checks (box 909) whether the end of maze (B) has been reached and, if not, returns to box 904. This loop will continue until either a fault is discovered, or the end of maze (B) is reached without any faults. It will be seen that time-out (b) is reset (box 904) approximately once every 66 milliseconds, and therefore it is not allowed to expire, and the fault channel is kept open.

If the process detects the incorrect execution of an instruction (box 908), it repeats that instruction, one transfer at a time, in order to discover the exact point of the maze (B) at which the fault occurred. First (box 910), the process resets time-out (b) and then (box 911) makes a "call to block." The fault channel process is then blocked for 66 milliseconds (box 912) by the supervisor. At the end of this period, the process is unblocked, and runs on any available processor. When the process runs again, its first action (box 913) is to apply a "transfer one-shot" command to the fault channel of the faulty processor, causing this processor to execute one transfer of the last instruction. The process then (box 914) examines the contents of the registers of the faulty processor to determine whether or not the transfer was correctly executed. If there is no fault, a check (box 915) is made to determine whether the end of the instruction has been reached and, if not, the process returns to box 910. This loop continues until either a faulty transfer is found or the end of the instruction is reached.

Next (box 916), the process compares the faults detected at boxes 908 and 914 with a list of faults which have been previously detected in the faulty processor, this list being held in a core store 11. If the fault is a new one, the process generates a print out (box 917) to notify this fault to the service engineers, and enters the fault in the list (box 918), so as to ensure that it is not printed out repeatedly.

The fault channel process then (box 919) makes a "call to finish" to the supervisor (see FIG. 6), and is put back into the dormant state (box 901). The result of this is to allow time-out (b) in the faulty processor to expire, whereupon the processor will close its fault channel and run maze (A) as previously described (see FIG. 7).

Referring still to FIG. 9, if maze (B) is completed without any faults being discovered (box 909), the fault channel process starts a detection check procedure in order to test the various parity checking circuits within the faulty processor. This is performed by writing predetermined parity-incorrect information into each of the processor registers in turn, and seeing whether this is detected by the appropriate parity checking circuits. First (box 920), the fault channel process resets time-out (b) in the faulty processor, to keep the fault channel open. The process then (box 921) makes a call to block, whereupon it is put into the blocked state (box 922) for 66 milliseconds. When the process runs again, it performs a detection check on a selected one of the registers (box 923), and examines the trap register to determine whether the parity error is detected correctly (box 924). If so, the process checks to see if all the required detection checks have been made (box 925). Assuming that more checks are still to be made, the process returns to box 920, to perform the next check.

When a fault is found at box 924, the processor proceeds, as before, to boxes 916 to 919 to print out the fault, if it is a new one, before making a "call to finish."

The above-described fault action may also be initiated in response to fault indications other than parity checks: for example, in response to an internal check within the process itself.

Returning to FIG. 7, where a fault detected by a processor is of such a nature that it is unlikely to have actually been produced by that processor (box 707), the above fault action may be modified, so that the processor attempts self-testing with maze (A) first, and only opens the fault channel to request action by another processor if maze (A) fails. For example, the system may be arranged to produce a fault indication should any process try to gain access to a portion of the working memory which is forbidden to it, e.g., because it is part of the working space of another process. Such an 'address protection failure' might occur because of a fault which arose when the process was running previously on a different processor, or even because of a software fault. Thus, in the case of such an address protection failure, the processor attempts self-testing before requesting diagnosis.

'Roll Back'

Under certain fault conditions a process may have some of its information mutilated or lost. In such a situation, the process is interrupted and re-started at the beginning of a special routine within the process, referred to as the process roll-back routine. Every process in the system contains such a roll-back routine, which is designed to restore the necessary working information to the process before it returns to its normal operation.

One situation in which a process may be interrupted and re-started at the beginning of its roll-back routine has already been described: i.e., as a result of detection of a fault by hardware circuits within the processor 10 in which the process was running at the time of the fault. Roll-back may also be initiated in other ways. For example, the supervisor program may be arranged to perform various checks on the running of the processes, and if it detects a fault affecting one or more of the processes, it may decide to roll back those processes. Thus, when a process generates a task, and makes a call to the supervisor to hand that task to another process (see FIG. 6), the supervisor may check whether the calling process is in fact allowed to pass tasks to that other process. If the calling process is not allowed to do this, the supervisor may then re-start the calling process at the beginning of its roll-back routine. As another example, roll-back of a process may be initiated by the supervisor program in response to a request from the process itself, as a result of failure of internal checks within the process.

Reference will now be made to FIG. 10, which is a flow chart of a typical process in the system, showing its roll-back routine. This process is assumed to be one which performs certain processing functions concerned ˈith the seting-up of telephone calls in a telephone exhange. These processing functions constitute the norıal routine of the process, and are represented by box 01 in FIG. 10. Box 102 represents the dormont state f the process. If the process is then handed a task (box 03) it is put into its suspended state (box 104). The rocess will now run on any of the processors 10 (FIG. ) which is available to it. When the process runs, it will tart at box 105, which is referred to as its normal startıg point. When it has dealt with a task, the process deides (box 106) whether there are any more tasks in its ıput queue of tasks and, if so, it returns to the normal tarting point 105. If there are no more tasks, the proess makes a "call to finish" (box 107) to the supervi- ɔr, and is put back into the dormant state.

The process has certain areas of the core store 11 FIG. 1) allocated to it as working storage, in which it eeps its working information. This working informaıon may include, for example, details of the states of large number of line circuits 19 in the system, as well s other information. Some of the more important /orking information has a duplicate copy stored on ·ne of the drum stores 12. However, a duplicate copy ; not provided of the details of the line circuits.

If a fault is discovered in the system which is likely to .ave mutilated or erased the working information of he process in the core stores 11, roll-back action is aken as follows. First, the supervisor program acts to eplace information in the core store that has a dupliate copy on the drum store with a fresh copy obtained rom the drum. The supervisor program then places the ɪrocess in the suspended state, ready to run again when . processor becomes available.

When the process runs again, it starts at the beginıing of its roll-back routine, as represented by the box 08 in FIG. 10. In this particular example, the roll-back outine acts to interrogate the line circuits, so as to re- :onstruct the information in the core store 11 regardng the states of these circuits. Each of the line circuits .9 has three "interrogate" wires, referred to as the Y, ; and NS wires, which are accessible to any of the pro- :essors 10 over its input/output highway 14, and the ɪppropriate input/output channel 15 and subchannel ı6 (see FIG. 1). Each of these wires carries a binary ignal which represents the state of a particular relay vithin the line circuit, and hence contains information egarding the current state of the line circuit as follows:

i. Y = 1 signifies that there is a call in progress through the line circuit; Y = 0 signifies that the line circuit is idle.

ii. S = 1 signifies that this is an outgoing call; S = 1 signifies an incoming call.

iii. In the case of an outgoing call, NS = 0 signifies that the line circuit is in the "speech" state (i.e., that the connection is fully set up); NS = 1 signifies either that the line circuit is idle, or that it has an outgoing call being set up on it, but not yet fully set up.

The roll-back routine interrogates (box 110) each of he line circuits 19, by applying the appropriate chanıel and subchannel addresses to the "address" wires of he input/output highway 14. This causes the signals ˈrom the Y, S and NS wires to be transmitted back to he processor (on which the routine is running) over he "data return" wires of the highway. Next, the rou- ine checks the value of the signal from the Y wire (box ı11). If Y=0, the line circuit is assumed to be idle. If Y=1, the routine checks the value of the signal from the S wire (box 112), and if S=0, the line circuit is assumed to be in the incoming speech state. If S=1, the routine checks the value of the signal from the NS wire (box 113), and if NS=0, the line circuit is assumed to be in the outgoing speech state. If NS=1, the line circuit is assumed to be in the idle state. It is, in fact, probably at some stage in the setting up of an outgoing call, but it is impossible to tell exactly what stage it is at from the signals on the three "interrogate" wires. In this case, therefore, the outgoing call which was being set up will be lost as a result of the fault. It will be appreciated, however, that only a very small number of calls will be lost in this way, since it is much more likely that the line circuit will be either in its "speech" state or its idle state.

Having performed these checks on the Y, S and NS signals, the routine addresses the storage location in the core store 11 which is allocated to the line circuit in question, and writes in a data word representing "idle," "outgoing speech" or "incoming speech" as the case may be (boxes 114, 115 and 116).

The routine then checks to see if it has scanned all the line circuits (box 117) and if not it returns to box 110, to interrogate another line circuit. When all the line circuits have been scanned, roll-back is complete, and the process continues running from its normal starting point 105.

It should be appreciated that different processes will contain different roll-back routines, depending on the requirements of each particular process. Thus, other processes may contain roll-back routines for scanning the states of peripherals other than line circuits; e.g., switching circuits 18 or senders and receivers 20 (FIG. 1).

"Roll back" is the subject of the claims of a copending British Patent Application No. 22292/72.

We claim:

1. A Multiprocessor computer system comprising:

a. a plurality of independent data processors, each having a data interface and a monitoring interface;

b. a data store common to all said processors, each of said processors having access to said data store;

c. a plurality of data highways, each data highway being connected to a respective processor;

d. a plurality of input/output channels connected to said data highways, each of said processors thereby having access to any one of said channels over its respective data highway;

e. a plurality of fault channels each of which is associated with a respective one of said processors, each fault channel being connected on one hand to the monitoring interface of its associated processor and on the other hand to the data highway of at least one other processor;

f. and an interrupt unit connected to each of said processors and being responsive to a request for service from any one of said processors to select another of said processors to attend to that request;

g. each of said processors including fault detection means for detecting faults occurring in that processor and for causing the associated processor, on occurrence of such a fault, to exclude itself from normal operation, to open its associated fault channel, and to apply a request for service to said interrupt unit.

2. A system according to claim 1, wherein each said fault channel includes means providing access to the associated processor when that associated processor requests service from another processor selected by said interrupt unit, each processor including means for subjecting, when so selected by said interrupt unit, a requesting processor to predetermined tests in order to diagnose the condition of the requesting processor.

3. A system according to claim 2, including a check program for running on the requesting processor under the control of the servicing processor, the servicing processor including means for monitoring the execution of each instruction, one at a time, for determining whether that instruction has been correctly executed.

4. A system according to claim 3, wherein, in the event of an instruction of said check program being incorrectly executed, the servicing processor includes means controlling the operation of the requesting processor to make it perform that instruction again, one microprogram transfer at a time, and means for monitoring the execution of each said transfer to determine whether that transfer has been correctly executed.

5. A system according to claim 1 wherein each said processor has a console comprising a plurality of controls and a display, the console being connected to the monitoring interface of the processor when the associated fault channel is closed, so as to permit operation of that processor to be monitored manually from said console; and each said fault channel comprises means for disconnecting the console controls from the monitoring interface of its associated processor when the fault channel is opened.

6. A system according to claim 1 wherein the monitoring interface of each processor carries data from a plurality of registers inside the processor, and each fault channel comprises multiplexing means for selecting data from any one of the registers in the associated processor in response to an instruction received from another said processor over its data highway; and means for transmitting the selected data back over the data highway of said other processor.

7. A system according to claim 6 wherein the data in each of said registers consists of a plurality of data bits and a parity check bit, and said means for transmitting selected data back over a data highway further includes means for transmitting this selected data along with further information to indicate whether or not the selected data is parity correct.

8. A system according to claim 1 wherein each of said input/output channels and said fault channels connected to a given one of said data highways has a unique address allocated to it, and each of said channels is provided with a decode logic circuit for recognising its own address when that address is applied to the data highway by the relevant processor, each of said channels including means responsive to said decode logic circuit to enable the channel so as to permit transfer of data between the channel and the data highway when said address is recognised.

9. A system according to claim 1 wherein each said processor further includes a timing means for timing a predetermined time-out period, said time-out period being started whenever the associated fault channel is opened, and being restarted when access is made to the processor over the fault channel by another processor, expiration of said time-out period causing the fault channel to be closed again and causing the processor to run a self-testing program, whereupon, if said self-testing program, is correctly completed, the processor is allowed to return to normal operation.

* * * * *